(12) United States Patent
Collins et al.

(10) Patent No.: US 11,292,966 B2
(45) Date of Patent: *Apr. 5, 2022

(54) PHOSPHOR COMPOSITION

(71) Applicant: CREELED, INC., Newark, CA (US)

(72) Inventors: Brian T. Collins, Holly Springs, NC (US); Christopher P. Hussell, Cary, NC (US); David T. Emerson, Chapel Hill, NC (US); Ronan P. Le Toquin, San Jose, CA (US)

(73) Assignee: CREELED, INC., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,874

(22) Filed: Jul. 31, 2020

(65) Prior Publication Data

US 2020/0362237 A1 Nov. 19, 2020

Related U.S. Application Data

(62) Division of application No. 16/296,818, filed on Mar. 8, 2019, now Pat. No. 10,767,111, which is a division
(Continued)

(51) Int. Cl.
*C09K 11/77* (2006.01)
*C04B 35/597* (2006.01)
(Continued)

(52) U.S. Cl.
CPC .......... *C09K 11/7734* (2013.01); *C04B 35/58* (2013.01); *C04B 35/581* (2013.01);
(Continued)

(58) Field of Classification Search
CPC .............. C09K 11/7734; C09K 11/025; C09K 11/0883; C09K 11/7728; C09K 11/08;
(Continued)

(56) References Cited

U.S. PATENT DOCUMENTS 6,096,243 A    8/2000  Oshio et al.
6,501,100 B1  12/2002  Srivastava et al.
(Continued)

FOREIGN PATENT DOCUMENTS

CN        1818012 A      8/2006
DE  10 2007 053770 A1    5/2009
(Continued)

OTHER PUBLICATIONS

Chinese Office Action, dated Jul. 24, 2014, for Chinese Patent Application No. 201080032353.X, pp. 1-4.
(Continued)

*Primary Examiner* — Andrew J. Oyer
(74) *Attorney, Agent, or Firm* — Crowell & Moring LLP

(57) ABSTRACT

A method is disclosed for forming a blended phosphor composition. The method includes the steps of firing precursor compositions that include europium and nitrides of at least calcium, strontium and aluminum, in a refractory metal crucible and in the presence of a gas that precludes the formation of nitride compositions between the nitride starting materials and the refractory metal that forms the crucible. The resulting compositions can include phosphors that convert frequencies in the blue portion of the visible spectrum into frequencies in the red portion of the visible spectrum.

20 Claims, 7 Drawing Sheets

Related U.S. Application Data of application No. 15/234,433, filed on Aug. 11, 2016, now Pat. No. 10,266,767, which is a division of application No. 12/271,945, filed on Nov. 17, 2008, now Pat. No. 9,428,688.

(51) Int. Cl.

| | | |
|---|---|---|
| *C04B 35/58* | (2006.01) | |
| *C04B 35/581* | (2006.01) | |
| *C04B 35/584* | (2006.01) | |
| *C09K 11/08* | (2006.01) | |
| *C09K 11/02* | (2006.01) | |
| *C04B 35/591* | (2006.01) | |
| *C04B 35/593* | (2006.01) | |

(52) U.S. Cl.
CPC .......... *C04B 35/584* (2013.01); *C04B 35/597* (2013.01); *C09K 11/025* (2013.01); *C09K 11/0883* (2013.01); *C04B 35/591* (2013.01); *C04B 35/593* (2013.01); *C04B 35/5935* (2013.01); *C04B 2235/3224* (2013.01); *C04B 2235/3852* (2013.01); *C04B 2235/3865* (2013.01); *C04B 2235/3869* (2013.01); *C04B 2235/3873* (2013.01); *C04B 2235/445* (2013.01); *C09K 11/7728* (2013.01)

(58) Field of Classification Search
CPC ....... C09K 11/77; C04B 35/597; C04B 35/58; C04B 35/581; C04B 35/584; C04B 2235/3869; C04B 35/591; C04B 35/593; C04B 35/5935; C04B 2235/3224; C04B 2235/3852; C04B 2235/3865; C04B 2235/3873; C04B 2235/445
See application file for complete search history.

(56) References Cited

U.S. PATENT DOCUMENTS

| | | | |
|---|---|---|---|
| 7,038,370 B2 | 5/2006 | Mueller-Mach et al. | |
| 7,253,446 B2 | 8/2007 | Sakuma et al. | |
| 7,262,439 B2 | 8/2007 | Setlur et al. | |
| 7,273,568 B2 | 9/2007 | Nagatomi et al. | |
| 7,291,289 B2 | 11/2007 | Gotoh et al. | |
| 7,358,542 B2 | 4/2008 | Radkov et al. | |
| 7,507,354 B2 | 3/2009 | Oshio | |
| 7,713,442 B2 | 5/2010 | Tian et al. | |
| 2004/0124758 A1 | 7/2004 | Danielson et al. | |
| 2006/0033083 A1 | 2/2006 | Sakane et al. | |
| 2007/0007494 A1 | 1/2007 | Hirosaki et al. | |
| 2007/0114548 A1 | 5/2007 | Setlur et al. | |
| 2008/0136310 A1 | 6/2008 | Chen et al. | |
| 2008/0212305 A1 | 9/2008 | Kawana et al. | |
| 2008/0283864 A1 | 11/2008 | LeToquin et al. | |
| 2008/0290785 A1* | 11/2008 | Schmidt ................ | C04B 35/581 313/501 |
| 2008/0303410 A1 | 12/2008 | Kaneda et al. | |
| 2009/0050846 A1 | 2/2009 | Becker et al. | |
| 2009/0072708 A1 | 3/2009 | Tamaki et al. | |
| 2009/0121615 A1* | 5/2009 | Le Toquin ......... | C09K 11/7734 313/503 |
| 2009/0140205 A1 | 6/2009 | Kijima et al. | |
| 2010/0123104 A1 | 5/2010 | Collins et al. | |
| 2010/0283076 A1 | 11/2010 | Winkler et al. | |

FOREIGN PATENT DOCUMENTS

| | | |
|---|---|---|
| EP | 1 104 799 A1 | 6/2001 |
| EP | 1 876 654 A1 | 1/2008 |
| JP | 2006-348244 A | 12/2006 |
| WO | WO 2000/33390 | 6/2000 |
| WO | WO 2004/036962 A1 | 4/2004 |
| WO | WO 2007/052200 A1 | 5/2007 |
| WO | WO 2007/120216 A2 | 10/2007 |

OTHER PUBLICATIONS

Chinese Second Office Action for Chinese Patent Application No. 201080021470.6, dated Mar. 20, 2015 (14 pages).
European Search Report for European Patent Application No. 10832001.1, dated Nov. 5, 2014 (8 pages).
Huang et al., "Phase Relations of the $Si_3N_4$—AlN—CaO System," *Journal of Materials Science Letters* 4, 1985, pp. 255-259.
English translation of International Search Report for ROC (Taiwan) Patent Application No. 099139421, dated Feb. 28, 2014, 1 page.
International Search Report of International Application No. PCT/US2009/063693 dated Jan. 20, 2010.
Li et al., "Low-Temperature Crystallation of Eu-Doped Red-Emitting $CaAlSiN_3$ from Alloy-Derived Ammonomelallates," *Chem. Mater.* 2007, 19, pp. 3592-3594.
Piao et al., "Preparation of $CaAlSiN_3:Eu^{2+}$ Phosphors by the Self-Propagating High-Temperature Synthesis and Their Luminescent Properties," *Chemical Mater.*, 2007, pp. 4592-4599.
Uheda et al., "Luminescence Properties of a Red Phosphor, $CaAlSiN_3:Eu^{2+}$, for White Light-Emitting Diodes," *Electrochemical and Solid-Slate Letters*, 9 (4) 2006, pp. H22-H25.
Watanabe et al., "Crystal Structure and Luminescence Properties of $Sr_xCa_{1-x}AlSiN_3:Eu^{2+}$ Mixed Nitride Phosphors," *Journal of Alloys and Compounds* 475, (2009) pp. 434-439.

\* cited by examiner

PHOSPHOR COMPOSITION

RELATED APPLICATION

The present patent document is a division of U.S. patent application Ser. No. 16/296,818, which was filed on Mar. 8, 2019, and which is a division of U.S. patent application Ser. No. 15/234,433, now U.S. Pat. No. 10,266,767, which was filed on Aug. 11, 2016, and which is a division of U.S. patent application Ser. No. 12/271,945, now U.S. Pat. No. 9,428,688, which was filed on Nov. 17, 2008. All of the aforementioned patent documents are hereby incorporated by reference in their entirety.

BACKGROUND

The present application relates to phosphors. In particular, the application relates to nitride phosphors that can convert blue photons from a light emitting diode into frequencies within the red portion of the visible spectrum. The production of such red tones helps tailor the color produced by an LED lamp, and in particular red photons help produce warmer white light from LED lamps.

Lighting is done in a number of different fashions. Incandescent lighting uses the emission from a tungsten filament to produce the characteristic light. Fluorescent lighting uses an ultraviolet source (mercury emission) to strike a photoluminescent material that produces the white light emission from a fluorescent lamp. Halogen lighting also uses a tungsten filament but includes a trace of halogen gas (typically iodine or bromine) that helps regenerate the tungsten filament during operation which in turn increases the lifetime of the lamp. Solid state lamps emit photons when a current is directed across a p-n junction (or its equivalent).

Each of the relevant forms of lighting have corresponding advantages and disadvantages. Incandescent lighting typically produces warmer colors and bulbs and fixtures are widely available at low cost. From an energy efficiency standpoint, however, incandescent bulbs tend to produce most of their energy as heat rather than light. Indeed, future regulatory schemes may minimize the availability of the most common incandescent bulbs.

Fluorescent lighting tends to be more energy-efficient that incandescent lighting, but requires starter circuits and related hardware. As a result, cost-effective fluorescent lighting that can be used in incandescent fixtures has only recently been developed. Fluorescent bulbs also typically contain mercury, even though in minimal amounts. Solid state lighting has the advantage of long lifetime, higher energy efficiency and potentially lower cost, but has historically suffered from low brightness and (as indicated elsewhere) the unavailability of the relevant colors that can produce white light.

More recently, solid-state lighting has become commercially available based on the increased availability at competitive prices of lamps based on light emitting diodes that can produce white light. Although solid-state devices (light emitting diodes) have been used for indicator purposes for several decades, two factors limited or precluded the use of light emitting diodes as the basis for illumination: the lack of diodes that could produce the frequencies required to produce white light; and, once such diodes became available, their generally low brightness.

Advances in the art have reduced these (and other) barriers to solid state lighting. First, blue light emitting diodes have been available at competitive prices in commercial quantities for over a decade. The blue light emitting diode is a necessary component of white light because (as explained below) the blue photons are required either to contribute to a three color lamp or to excite an appropriate phosphor.

As a second advance, the brightness of available LED lamps continues to increase.

Because white light is a combination of many frequencies within the visible spectrum, it can be produced from blue, green and red primary sources. Thus, a lamp that emits white light can be produced from one or more red light emitting diodes, one or more green light emitting diodes and one or more blue light emitting diodes. This technique can be relatively complex, however, because of the number of diodes required.

In the recent growth of white light-emitting lamps using light emitting diode sources, the most common method has been to incorporate a light emitting diode that emits in the blue, violet or ultraviolet portions of the electromagnetic spectrum. Such a diode is then combined, usually in a package that includes a lens, with a phosphor that absorbs the blue (violet, UV) emission and produces a yellow emission in response. The combination of the blue light from the diode and the yellow light from the phosphor gives white light.

As well-understood in this art, a phosphor is a composition that generally absorbs a given frequency, or range of frequencies, of light and then emits different color photons, usually of a lower frequency and usually including a range of frequencies.

A typical phosphor is a solid composition that includes an (activator) ion in a host structure. Because light emitting diodes that will produce blue light are relatively new in commercial appearance (about a decade), the use of blue light emitting diodes combined with yellow phosphors to produce white light is also relatively recent.

Different white light sources, however, have slightly different appearances to the human eye. These are sometimes quantified using a well-recognized measurement referred to as color temperature. When stated descriptively, white light that is more bluish in tint is referred to as being cooler, while light that has more of a yellow or red component is generally referred to as being warmer. Depending upon the desired end use, cooler lamps are preferred in some circumstances while warmer whites are preferred in other circumstances. As one example, skin colors tend to look more natural under warmer lamps than under cooler ones.

In general, incandescent lighting is warmer than fluorescent lighting; although warmer fluorescent lamps are available. In any case, if LED lighting is to successfully replace incandescent and fluorescent lighting (for reasons in addition to its energy advantages), diode lamps that will emit with a red or yellow component to give a warmer appearance will be desired.

Because blue light emitting diodes are relatively recent, the need or commercial desire for phosphors that can convert a blue photon into a red emission in the context of an LED lamp is also relatively recent. One predominant source for such a phosphor is set forth in international application number WO2005052087 (and also published as US20070007494). This publication describes a nitride-based phosphor that is relatively recent in its commercial appearance. The phosphor composition is formed of materials that are highly reactive in water or air, and thus is relatively difficult to produce without sophisticated equipment.

In most typical LED applications, a phosphor must have color stability; i.e., its chemical composition must be consistent enough over the course of time so that the color of the light emitted by the lamp remains consistent. Stated differently, if the phosphor chemical composition breaks down relatively quickly, the color produced by the diode lamp will change quickly, and usually in an undesired manner.

The phosphor described in the '087 publication is also expensive, available only from limited sources, and because of manufacturing difficulty, is sometimes hard to obtain. For example, the silicon nitride that is typically one of the starting materials is relatively inert, even at high temperatures. Indeed, because of its high-temperature stability, silicon nitride is typically used as passivation for semiconductor components. Additionally, the alkaline earth metals that represent other starting materials react quickly (often too quickly) with oxygen and moisture.

Accordingly, a need exists for improved processes and resulting phosphor compositions that will produce a red emission, when stimulated by a blue photon that are stable in their composition and color output, and that are more easily manufactured than currently available phosphors having this characteristic.

SUMMARY

In one aspect, the invention is a method of making a phosphor composition that down-converts photons in the blue and ultraviolet portions of the visible spectrum into photons in the longer wavelength portions of the visible spectrum. The method comprises mixing a composition containing a cation from the group consisting of calcium, strontium, lithium, sodium, potassium, rubidium, cesium, magnesium, barium, scandium, yttrium, lanthanum, gadolinium, and lutetium with a composition containing a cation from the group consisting of aluminum, silicon, boron, gallium, carbon, germanium, and phosphorus, and with an anion selected from the group consisting of nitrogen, sulfur, chlorine, bromine, and iodine. The compositions are also mixed with an activator selected from the group consisting of europium (II), cerium (III), ytterbium (II), samarium (II) and manganese (II). The mixture is heated in the presence of a forming gas at or near atmospheric pressure and in a refractory crucible that is substantially inert in the presence of the forming gas mixture. The temperature is sufficient to produce the phosphor but less than the temperature at which the precursor compositions or the phosphor would decompose or react with the crucible and the reaction is carried out for a time sufficient to produce a phosphor that down converts photons from the ultraviolet and blue portions of the visible spectrum into photons in longer wavelengths portions of the visible spectrum.

In another aspect, the invention is a method of making a phosphor composition that comprises mixing a nitride selected from the group consisting of nitrides of calcium and nitrides of strontium with a nitride selected from the group consisting of nitrides of aluminum and nitrides of silicon with a europium source composition in the substantial absence of water and oxygen. The mixture is heated in the presence of a forming gas that is a mixture of hydrogen and nitrogen at about atmospheric pressure, and in a refractory crucible that is substantially inert in the presence of the forming gas mixture. The temperature is sufficient to produce the phosphor but less than a temperature at which the precursor compositions or the phosphor would decompose or react with the crucible and the reaction is carried out for a time sufficient to produce a phosphor composition that will down convert photons in the blue and ultraviolet regions of the spectrum into photon in the longer-wavelength regions of the visible spectrum.

In another aspect, the invention is a method of making a phosphor composition that absorbs in the blue portion of the visible spectrum and emits in the red portion of the visible spectrum. The method includes the steps of mixing nitrides of calcium, nitrides of strontium, nitrides of aluminum and nitrides of silicon with europium fluoride in the substantial absence of water and oxygen, heating the mixture in the presence of a forming gas that is a mixture of about 5% hydrogen and 95% nitrogen, at about atmospheric pressure, in a refractory crucible that is substantially inert in the presence of the forming gas mixture, at a temperature sufficient to produce the phosphor but less than a temperature at which the precursor compositions or the phosphor would decompose or significantly react with the crucible, for a time sufficient to produce a phosphor composition with a nominal composition of $Ca_{1-x-y}Sr_xEu_yAlSiN_3$ mixed with an amount of silicon aluminum oxynitride of at least 1%.

In another aspect, the invention comprises firing precursor compositions that include europium and nitrides of at least calcium, strontium and aluminum, in a refractory metal crucible and in the presence of a gas that precludes the formation of nitride compositions between the nitride starting materials and the refractory metal that forms to crucible.

In another aspect, the invention is a phosphor composition that converts frequencies in the blue portion of the visible spectrum into frequencies in the red portion of the visible spectrum. The phosphor composition comprises $Ca_{1-x-y}Sr_x Eu_yAlSiN_3$ (preferably where $0<x<1$ and $0<y<1$) combined with silicon aluminum oxynitride in an amount of at least 1% by weight.

The foregoing and other objects and advantages of the invention and the manner in which the same are accomplished will become clearer based on the followed detailed description taken in conjunction with the accompanying drawings.

DETAILED DESCRIPTION

Figure 1:
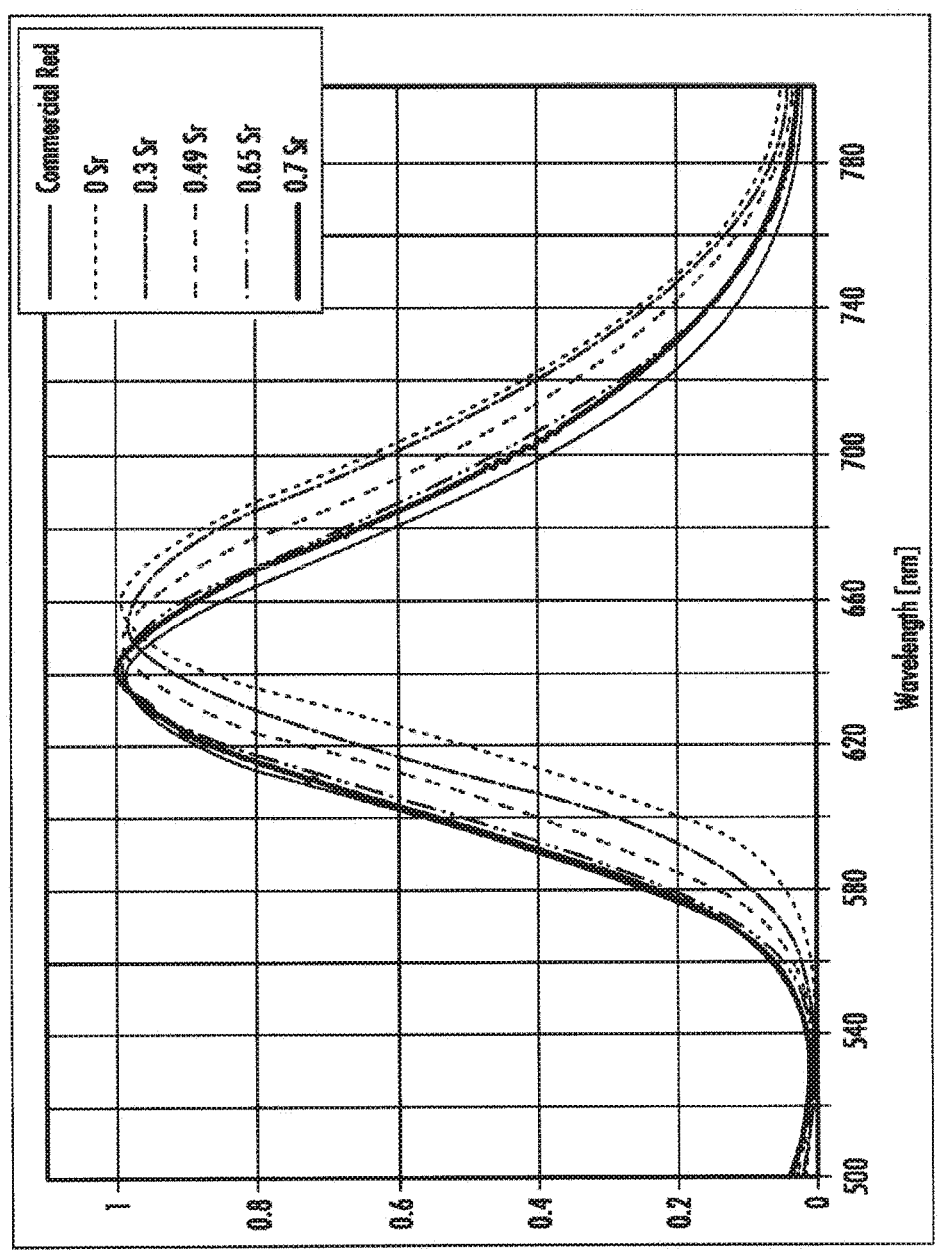
FIG. 1 is a plot of relative intensity of phosphor emission plotted against the wavelength in nanometers (nm) for phosphor compositions according to the present invention.

In a broad aspect, the invention is a method of making a phosphor composition that down-converts photons into the longer wavelength portions of the visible spectrum. The method comprises mixing a composition containing a cation from the group consisting of calcium, strontium, lithium, sodium, potassium, rubidium, cesium, magnesium, barium, scandium, yttrium, lanthanum, gadolinium, and lutetium with a composition containing a cation from the group consisting of aluminum, silicon, boron, gallium, carbon, germanium, and phosphorus, and with an anion selected from the group consisting of nitrogen, sulfur, chlorine, bromine, and iodine.

As used herein, the phrase "composition containing a cation" refers to a composition that will, under the reaction conditions, produce the element as a cation in the resulting phosphor composition. The element does not necessarily need to be present as a cation in the source material.

The compositions are also mixed with an activator selected from the group consisting of europium (II), cerium (III), ytterbium (II), samarium (II) and manganese (II). As in the case of the cations, the activator can be added in the form of any composition that produces the desired activator atom (typically as an ion) in the crystal lattice of the resulting phosphor and without otherwise interfering in an undesired manner with the process steps or the other starting compositions.

The mixture is heated in the presence of a forming gas and (in most embodiments) in the substantial absence of water and oxygen at about atmospheric pressure and in a refractory crucible. In most embodiments, the crucible is substantially inert in the presence of the forming gas mixture. The temperature is sufficient to produce the phosphor but less than the temperature at which the precursor compositions or the phosphor would decompose or react with the crucible and the reaction is carried out for a time sufficient to produce a phosphor that down converts photons from the ultraviolet and blue portions of the visible spectrum into photons in longer wavelengths portions of the visible spectrum.

In another aspect, the invention is a method of making a nitride phosphor composition that comprises mixing a nitride selected from the group consisting of nitrides of calcium and nitrides of strontium with a nitride selected from the group consisting of nitrides of aluminum and nitrides of silicon with a europium source composition in the substantial absence of water and oxygen.

The term "nitride phosphor" is used herein to describe phosphors for which the cation is predominately nitride and in which the amount of any oxygen present in the crystal structure is so minimal as to avoid changing the crystal structure from that fundamentally formed by the nitride. Stated in another fashion, the phosphors described herein are not "oxynitride" phosphors.

Persons skilled in this art recognize that there is no bright line that defines the amount of oxygen present that causes the composition to be categorized as an oxynitride rather than a nitride, but generally speaking in a nitride phosphor, only very small amounts of oxygen are present.

As used herein, the phrase "europium source composition" refers to a composition that will produce europium as the activator cation in the crystal lattice of the phosphor under the reaction conditions set forth herein. As set forth elsewhere herein, europium fluoride is exemplary.

The mixture is heated in the presence of a forming gas that is a mixture of hydrogen and nitrogen at about atmospheric pressure, and in a refractory crucible that is substantially inert in the presence of the forming gas mixture. The temperature is sufficient to produce the phosphor but less than a temperature at which the precursor compositions or the phosphor would decompose or react with the crucible and the reaction is carried out for a time sufficient to produce a phosphor composition that will down convert photons in the blue and ultraviolet regions of the spectrum into photons in the longer-wavelength regions of the visible spectrum.

In an exemplary aspect, the invention is a method of making a phosphor composition that absorbs in the blue portion of the visible spectrum (i.e., between about 430 and 480 nm) and emits in or towards the red portion of the visible spectrum (i.e., between about 530 and 750 nm). Persons skilled in this art recognize, of course, that the boundaries for colors in the visible spectrum are used descriptively rather than in a limiting sense.

All of the techniques described herein with respect to the synthesis of the composition and of the measurement of its properties (e.g., x-ray powder diffraction), are generally well understood in this art and can be conducted by persons of ordinary skill in this art without undue experimentation. Accordingly, such well-understood techniques have not been otherwise described in redundant detail.

In this embodiment, the method comprises mixing nitrides of calcium, nitrides of strontium, nitrides of aluminum, and nitrides of silicon with europium fluoride in the substantial absence of water and oxygen. This mixture is heated in the presence of a forming gas. The heating step is carried out in a refractory crucible (typically metal) that is described in more detail in connection with FIGS. 5-7 and that is substantially inert in the presence of the forming gas. The heating step is carried out a temperature high enough to produce the composition at a reasonable rate but less than a temperature at which the precursors or product compositions would decompose or at which the compositions and the crucible would significantly react with each other.

Most typically, the heating step is carried out at a temperature of between about 1500° C. and 1800° C. for a time sufficient to produce a phosphor composition with a nominal composition of $Ca_{1-x-y}Sr_xEu_yAlSiN_3$ mixed with an amount of silicon aluminum oxynitride (typically $Si_2Al_4O_4N_4$) of at least 1% by weight. In typical embodiments, x is between about 0.5 and 0.7 and y is between about 0.013 and 0.017.

Under these conditions, the phosphor can be synthesized at or near ambient (i.e., atmospheric) pressures, thus offering significant process advantages by avoiding the need for high pressure techniques and equipment.

In the methods according to the invention, the phrase "at or near atmospheric pressure" is not intended to limit the reaction to exactly one atmosphere of gas pressure, but instead is intended to describe a reaction scheme in which high pressure (or any pressurized or pressurizing) equipment is unnecessary. Although the method of the invention can be carried out at atmospheric pressure, it is not limited to atmospheric pressure. Thus, the reaction can be carried out at more elevated pressures if desired. In many circumstances, however, the capability to produce the phosphor at atmospheric pressure is advantageous because it simplifies both the process steps and the necessary equipment.

The term "forming gas" is used in its well-understood meaning; i.e., a mixture of nitrogen and hydrogen that is used in a variety of applications where the presence of hydrogen is advantageous, and in which the presence of the nitrogen favorably reduces or eliminates the possibility of combustion. Forming gas usually has a high nitrogen content and a small hydrogen content, with amounts of between about 5 and 10% hydrogen being typical. In many circumstances, a mixture of 95% nitrogen and 5% hydrogen is commercially available and thus advantageous from a practical standpoint.

Although applicants do not wish to be bound by any particular theory, it has been observed to date that under the present reaction conditions, pure nitrogen (i.e., 99.9% purity or above) does not form a suitable nitride phosphor. The forming gas also helps keep the europium in the (II) oxidation state rather than the (III) oxidation state. The forming gas also helps keep nitrogen from reacting with the crucible in a manner directly analogous to oxidation. Under these conditions, and although the applicants do not wish to be bound by any theory, the resulting 1% of silicon aluminum oxynitride may be gettering most or all of any oxygen present in the starting materials.

In another aspect, the invention comprises the phosphor composition formed according to the method.

In an exemplary embodiment, the calcium nitride starting material is typically ($Ca_3N_2$), the strontium nitride is typically ($Sr_2N$), the aluminum nitride is stoichiometric (AlN), and the silicon nitride is also typically stoichiometric ($Si_3N_4$).

The refractory crucible is substantially inert in the presence of the forming gas mixture. Those skilled in the art will recognize that synthesizing a phosphor in an inappropriate or less suitable crucible material can reduce the optical performance of a phosphor. Such degradation usual results from some reaction between the crucible material and the reactants. For example, when aluminum oxide crucibles were used in reactions similar to those described herein, the oxygen from the crucible tended to be incorporated into the resulting phosphor powder which in turn demonstrated poor luminescent qualities. The use of forming gas with boron nitride crucibles tends to produce a dimmer result than in the preferred embodiments.

In the present invention, crucibles of tungsten (W) and molybdenum (Mo) have been determined to be advantageous. Tungsten and molybdenum are refractory metals, they can withstand high temperatures and are inert under the correct atmospheres. In contrast to the method tungsten and molybdenum are not stable in the '494 firing conditions described in the '494 publication (100% nitrogen) because they each form nitrides; i.e. tungsten nitride and molybdenum nitride respectively.

In the present invention, the firing atmosphere is a blend of nitrogen and hydrogen, typically 95% nitrogen and 5% hydrogen. The presence of hydrogen helps prevent the formation of undesired tungsten nitrides and molybdenum nitrides.

The heating steps (firing) can be carried out in several steps at different temperatures with appropriate ramping in between. The composition according to the present invention has been successfully produced using a one hour heating step at 800° C., followed by another one hour heating step at 1200° C. and a two-hour heating step above 1600° C. (typically 1675° C.) with ramping steps of about 350° C. per hour between heating steps. A comparable phosphor has also been produced by heating the materials directly to temperatures above 1600° C.

Using the invention, yields have been observed in the 90% range and on information and belief at least 95% in most circumstances.

The resulting composition includes europium in a mole fraction ("y") of between about 0.013 and 0.017 and a mole fraction of strontium ("x") of between about 0.5 and 0.65. Thus, calcium is typically present in a mole fraction of between about 0.333 and 0.487.

The method could also be used to produce a phosphor of the formula $Sr_2Si_5N_8$.

FIG. 1 is a plot of relative intensity versus wavelength for phosphor compositions according to the claimed invention. The emission colors set forth in the figures are described mathematically using color coordinates based upon the 1931 CIE chromaticity diagram and that are abbreviated as ccx and ccy. Thus, the plots represent the ccy value of diodes incorporating phosphors according to the invention using blue light with the ccx coordinate held constant at 0.290. In FIGS. 1-4 the phosphor was irradiated at a wavelength of between about 450 and 470 nanometers (e.g., 454 nm) and the emission was measured on a conventional spectrometer (e.g., Instrument Systems Optische Messtechnik GmbH, Munich, Germany).

As FIG. 1 indicates, in the absence of strontium, the peak output wavelength tends to be about 660 nm and the addition of increasing amounts of strontium produce a peak output increasingly similar to that of commercial red phosphor such as that described in the '494 publication.

The term "peak wavelength" is used herein in its conventional sense; i.e., the wavelength at which the optical power of a source (here the diode) is at a maximum. Most diodes emit a range of frequencies near the peak wavelength, and thus in some circumstances the color of the diode is expressed as the width at half maximum as a way of informing the skilled person about the characteristics of the emitted light.

Figure 2:
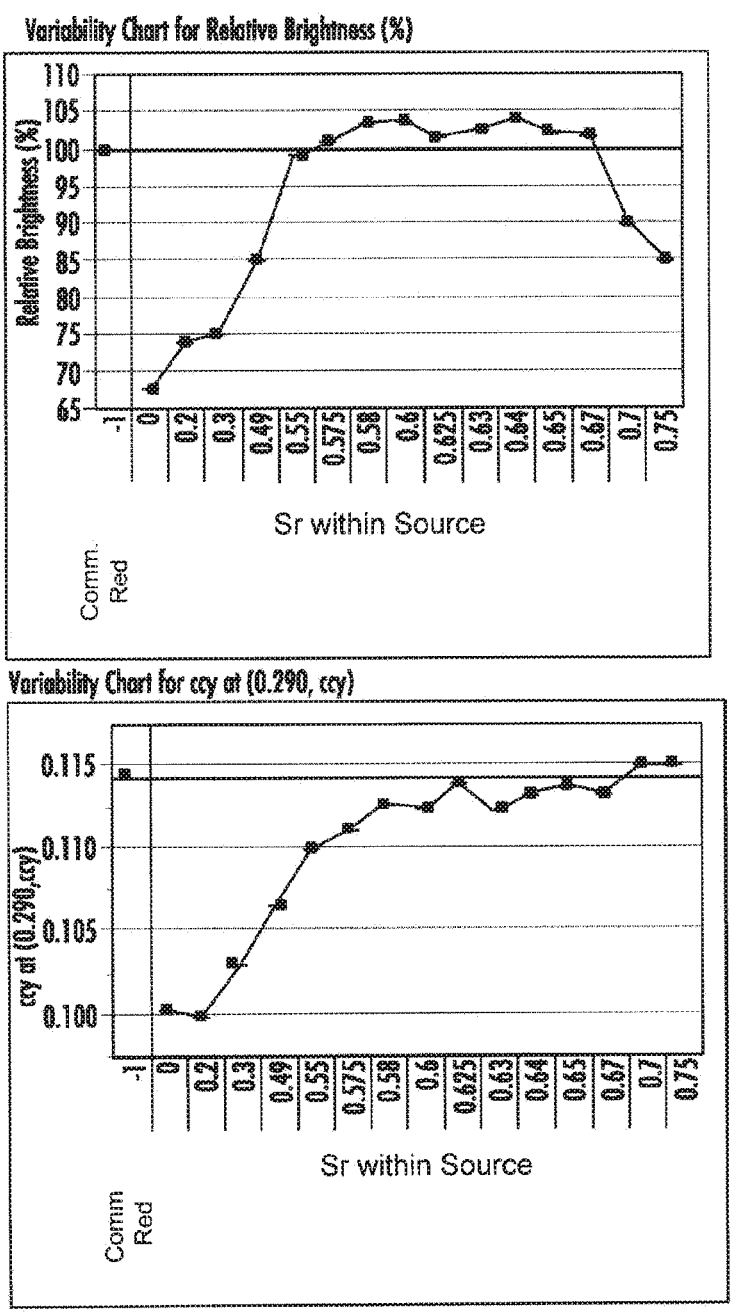
FIG. 2 plots the variability of the relative brightness (top) and the relative color (bottom) of the emission against the atomic fraction of strontium in phosphors according to the present invention

FIG. 2 represent charts of relative brightness and color coordinates versus the amount of strontium for compositions according to the claimed invention. As the top portion (brightness) of FIG. 2 indicates, the best results were obtained at an atomic fraction of strontium of between about 0.55 and 0.67. The bottom portion of FIG. 2 shows that the color was most consistent at an atomic fraction of strontium of between about 0.58 and 0.67.

Figure 3:
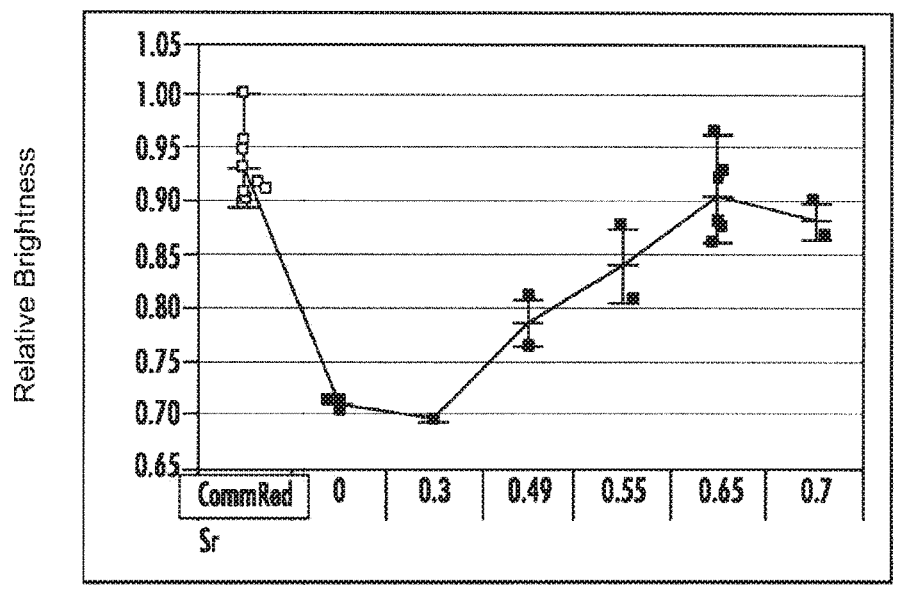
FIGS. 3 and 4 are plots illustrating variations in brightness and color for commercial phosphors and phosphors according to the present invention.
Figure 4:
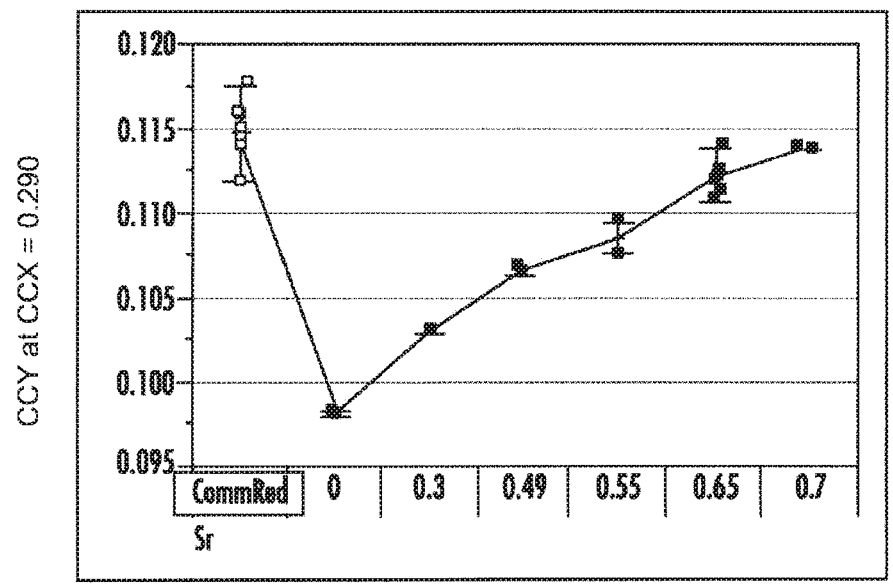

FIGS. 3 and 4 illustrate variation in brightness and color in bar chart fashion for commercial red phosphor and for phosphors according to the present invention. FIG. 3 shows the variation in brightness while FIG. 4 shows the ccy achieved when ccx=0.290 for commercial red phosphor and phosphors with different amounts of strontium and formed according to the present invention.

Figure 5:
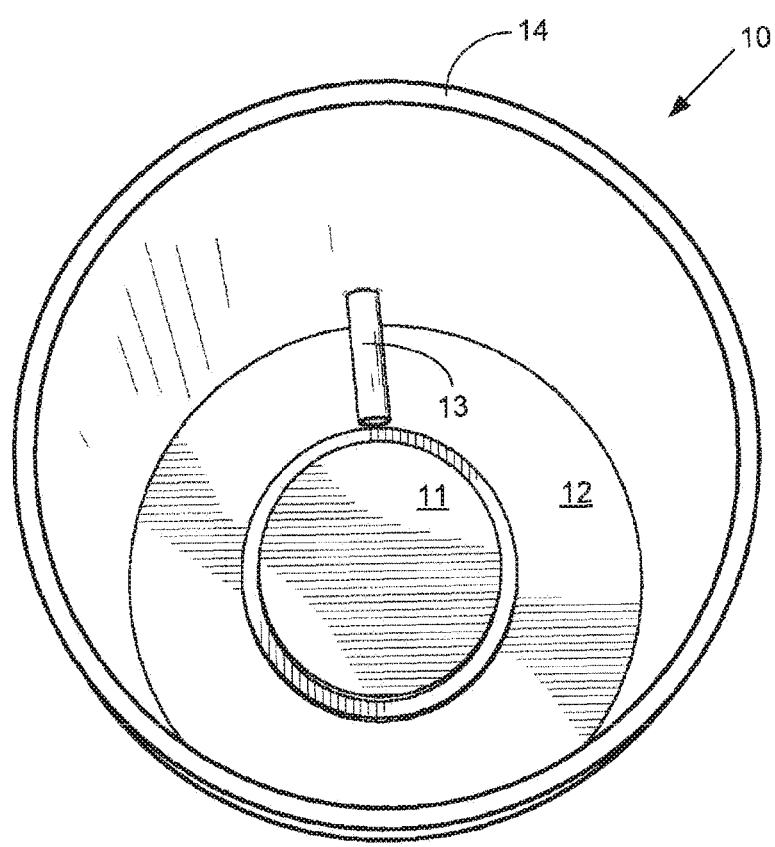
FIG. 5 is a top perspective view of the interior of a reaction vessel according to the present invention.
Figure 6:
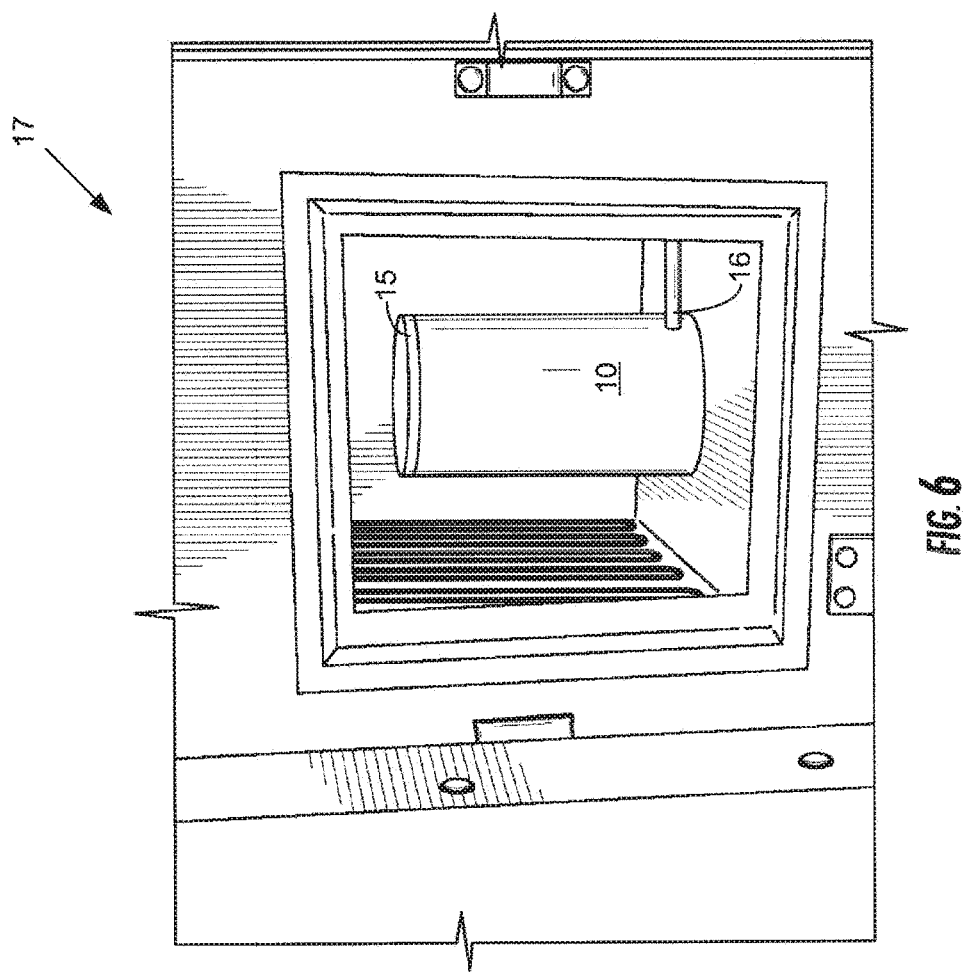
FIG. 6 is a perspective view of the reaction arrangement according to the present invention.
Figure 7:
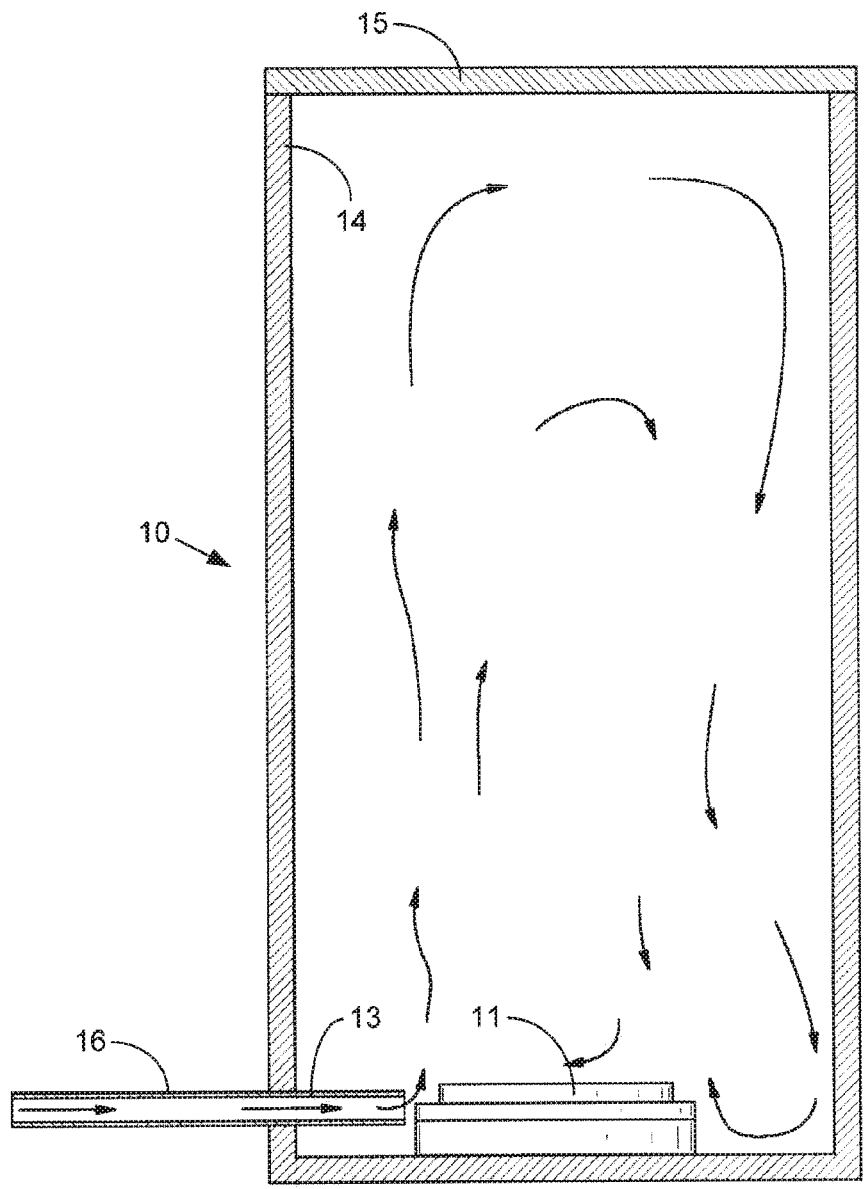
FIG. 7 is a cross-sectional view of the reaction vessel illustrated in FIGS. 5 and 6.

FIGS. 5, 6 and 7 illustrate additional aspects of the invention. FIG. 5 is a top perspective view of a relatively large alumina crucible broadly designated at 10. In the method of the invention, the nitrides of calcium, strontium, aluminum, and silicon are mixed (typically as powders) with the europium fluoride in a glove box (not shown), which is essentially free of water and oxygen. The powders are then loaded into the tungsten or molybdenum crucible shown as the circular crucible 11 resting on the floor 12 of the large alumina crucible 10. A gas flow tube 13 projects into the interior of the crucible 10 through the cylindrical wall 14.

FIG. 6 shows the crucible 10 and a lid 15 and the external portion of the gas tube 16. The alumina crucible 10 is placed in a box furnace broadly designated at 17. The alumina crucible 10 is not absolutely required. If the furnace itself is fitted to contain the forming gas atmosphere, the alumina crucible 10 illustrated in the drawings can be optional.

The tube 16 is typically formed of a ceramic material, which is likewise selected to be unaffected by the forming gas or by any of the compositions used to form the phosphor or by the phosphor itself.

The box furnace 17 is then used to heat the materials using the thermal cycle described earlier.

FIG. 7 is a cross-sectional view of the alumina crucible 10 illustrating the cylindrical wall 14 and the lid 15. The ceramic tube 16, 13 extends through the wall 14 to the interior of the alumina crucible 10 and the arrows schematically illustrate the forming gas flowing over the tungsten or molybdenum crucible 11.

The resulting composition can be a formula that is stoichiometric or it can include the silicon oxynitride as a separate composition or the silicon oxynitride can be combined with the europium-based phosphor. Applicants do not wish to be bound by any particular theory and the exact molecular composition of the phosphor remains partially undetermined, subject to the information provided herein.

The mixture is pulverized in conventional fashion for use as may be desired or necessary. The size of the pulverized particles depends on the end application and in most circumstances can be chosen by the end user.

Figure 8:
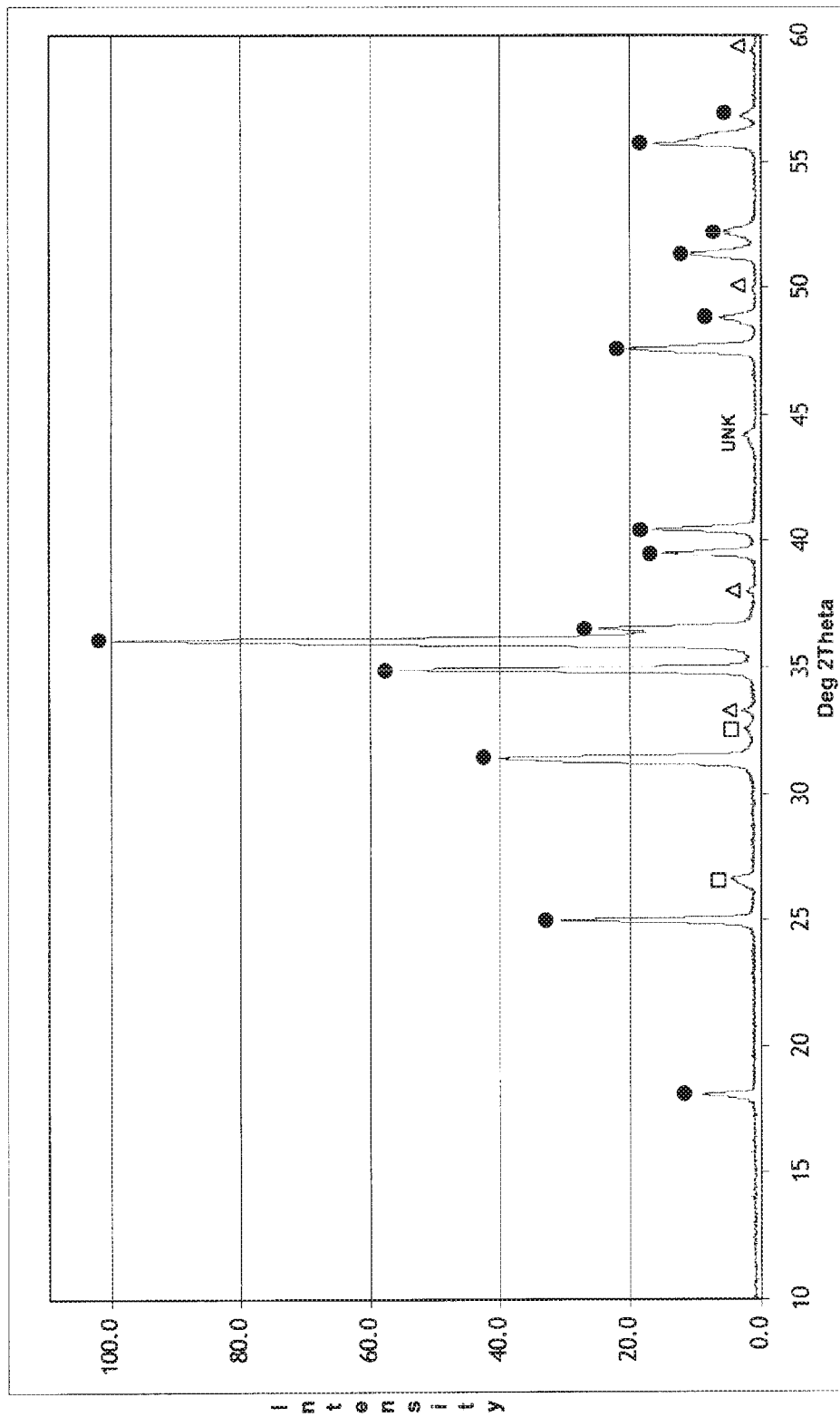
FIG. 8 is an x-ray powder diffraction plot for a phosphor composition according to the present invention.

FIG. 8 is an x-ray powder diffraction pattern of a phosphor composition according to the present invention. The powder diffraction was carried out in a conventional manner (Kα line of Cu, scanned from 10-60 degrees (2θ)) and the results are generally well understood by those of ordinary skill in this art. These results can also be reproduced without undue experimentation.

In FIG. 8, the solid circles represents diffraction peaks generated by the phosphor, the open squares represent peaks generated by the silicon aluminum oxynitride, the open triangles represent the presence of aluminum nitride, and one peak represents an unknown (to date) material.

Most importantly, FIG. 8 illustrates the presence of the silicon aluminum oxynitride phase. For comparison purposes, the x-ray diffraction patterns of various compositions are indexed under the JCPDS file system (Joint Committee on Powder Diffraction Standards) for categorizing x-ray diffraction patterns.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A method of making a phosphor composition, the method comprising:
    forming a mixture comprising:
        a cation selected from the group consisting of calcium, strontium, lithium, sodium, potassium, rubidium, cesium, magnesium, barium, scandium, yttrium, lanthanum, gadolinium, and lutetium;
        a cation selected from the group consisting of aluminum, silicon, boron, gallium, carbon, germanium, and phosphorus;
        an anion selected from the group consisting of nitrogen, sulfur, chlorine, bromine, and iodine; and
        an activator selected from the group consisting of europium (II); cerium (III), ytterbium (II), samarium (II) and manganese (II);
    heating the mixture in the presence of a forming gas; and
    forming from the mixture a phosphor composition including at least a first phase,
    wherein, when the phosphor composition is exposed to Kα x-rays from Cu, the first phase exhibits maximum intensity diffraction peaks at 2θ values of about 31.5°, about 35.0°, and about 36.1°.

2. The method of claim 1, wherein the first phase comprises $Ca_{1-x-y}Sr_xEu_yAlSiN_3$, where $0<x<1$ and $0<y<1$.

3. The method of claim 2, wherein x is between 0.50 and 0.70.

4. The method of claim 3, wherein x is between about 0.55 and 0.67.

5. The method of claim 2, wherein y is between about 0.013 and 0.017.

6. The method of claim 1, wherein the phosphor composition further comprises a second phase, and wherein, when the phosphor composition is exposed to Kα x-rays from Cu, the second phase exhibits maximum intensity diffraction peaks at 2θ values of about 26.6° and about 32.6°.

7. The method of claim 6, wherein the second phase comprises a silicon aluminum oxynitride.

8. The method of claim 7, wherein the silicon aluminum oxynitride comprises $Si_2Al_4O_4N_4$.

9. The method of claim 6, wherein the phosphor composition further comprises a third phase, and wherein, when the phosphor composition is exposed to Kα x-rays from Cu, the third phase exhibits maximum intensity diffraction peaks at 2θ values of about 33.2° and about 37.9°.

10. The method of claim 9, wherein the third phase comprises AlN.

11. The method of claim 9, wherein the phosphor composition further comprises a fourth phase, and wherein, when the phosphor composition is exposed to Kα x-rays from Cu, the fourth phase exhibits a maximum intensity diffraction peak at a 2θ value of about 44.2°.

12. The method of claim 1, wherein the phosphor composition absorbs wavelengths of between about 430 and 480 nanometers and emits peak wavelengths of between about 530 and 750 nanometers.

13. The method of claim 1, wherein heating the mixture comprises firing at a temperature of between about 1500 and 1800° C.

14. The method of claim 1, wherein heating the mixture includes at least three heating steps at increasingly higher temperatures.

15. The method of claim 14, wherein the at least three heating steps include a one hour heating step at 800° C., a one hour heating step at 1200° C., and a two hour heating step at 1675° C.

16. The method of claim 15, further comprising ramping steps of 350° C. per hour between the heating steps.

17. The method of claim 1 wherein the mixture is heated in the substantial absence of water and oxygen.

18. The method of claim 1 wherein the mixture is heated in a refractory crucible that is substantially inert in the presence of the forming gas.

19. The method of claim 1, wherein the forming gas comprises about 95% nitrogen and about 5% hydrogen.

20. The method of claim 1, wherein the mixture includes $Ca_3N_2$, $Sr_2N$, AlN and $Si_3N_4$.

* * * * *